(12) United States Patent
Chantant et al.

(10) Patent No.: US 10,953,455 B2
(45) Date of Patent: Mar. 23, 2021

(54) METHOD FOR PRODUCING A SERIES OF AT LEAST A FIRST AND A SECOND HEAT EXCHANGERS

(71) Applicant: L'Air Liquide, Societe Anonyme pour l'Etude et l'Exploitation des Procedes Georges Claude, Paris (FR)

(72) Inventors: Nicolas Chantant, Grenoble (FR); Natacha Haik, Champigny-sur-Marne (FR); Daniel Machon Diez De Baldeon, Paris (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 0 days.

(21) Appl. No.: 16/599,563

(22) Filed: Oct. 11, 2019

(65) Prior Publication Data

US 2020/0130044 A1 Apr. 30, 2020

(30) Foreign Application Priority Data

Oct. 24, 2018 (FR) ...................................... 1859810

(51) Int. Cl.
*B21D 53/08* (2006.01)
*B23P 15/26* (2006.01)
(Continued)

(52) U.S. Cl.
CPC ............ *B21D 53/085* (2013.01); *B23P 15/26* (2013.01); *F28D 9/0062* (2013.01);
(Continued)

(58) Field of Classification Search
CPC ........... F28F 9/0202–0212; F28F 9/026; F28F 9/0265–0268; F28F 9/028;
(Continued)

(56) References Cited

U.S. PATENT DOCUMENTS 10,124,452 B2 * 11/2018 Army .................... F28F 9/0214
2005/0006067 A1 * 1/2005 Hoglinger ............. F28D 1/0443
165/140

(Continued)

FOREIGN PATENT DOCUMENTS

EP 0 448 991 10/1991
EP 0 529 329 3/1993
(Continued)

OTHER PUBLICATIONS

French Search Report and Written Opinion for FR 1859810, dated Jul. 3, 2019.

*Primary Examiner* — Matthew P Travers
(74) *Attorney, Agent, or Firm* — Justin K. Murray

(57) ABSTRACT

In a method for producing a series of at least a first and a second plate and fin heat exchanger, each having at least one fluid distribution tank capping at least some of the openings of the matrix unit and which is connected to a pipe, the tank is partitioned into several compartments using at least one partition, so as to distribute the number of openings assigned to a first fluid and to a second fluid, the partition being designed to divide the tank into several compartments which are each connected to a pipe for the passage of the first fluid or of the second fluid and which each communicate with a number of openings that varies according to the configuration adopted by the at least one partition, for the exchanger of the series.

11 Claims, 2 Drawing Sheets

(51) Int. Cl.
*F28F 9/02* (2006.01)
*F28D 9/00* (2006.01)
*F28F 3/02* (2006.01)
*F28F 9/26* (2006.01)
*F28F 3/08* (2006.01)
*F28D 21/00* (2006.01)

(52) U.S. Cl.
CPC ............ *F28D 9/0093* (2013.01); *F28F 3/025* (2013.01); *F28F 3/086* (2013.01); *F28F 9/026* (2013.01); *F28F 9/0209* (2013.01); *F28F 9/26* (2013.01); *F25J 2290/32* (2013.01); *F25J 2290/42* (2013.01); *F28D 2021/0033* (2013.01)

(58) Field of Classification Search
CPC ......... F28F 2009/222–226; F28F 3/025; F28F 3/08; F28F 3/086; F28F 9/26; F28D 2021/0033; F28D 2009/0287; F28D 9/0025; F28D 9/0031–0037; F28D 9/0062; F28D 9/0093; F25J 2290/32; F25J 2290/42; F25J 3/04193; F25J 3/04218; F25J 3/04872; F25J 5/002; B23P 15/26; B21D 53/04; B21D 53/085
See application file for complete search history.

(56) References Cited

U.S. PATENT DOCUMENTS

| | | | |
|---|---|---|---|
| 2007/0074858 A1* | 4/2007 | Agee | ................... F28D 9/0037 165/146 |
| 2014/0069136 A1* | 3/2014 | Lim | ........................ F28F 1/02 62/434 |
| 2018/0292136 A1* | 10/2018 | Baek | ........................ F28D 1/03 |

FOREIGN PATENT DOCUMENTS

| | | |
|---|---|---|
| EP | 2 708 840 | 3/2014 |
| EP | 2 950 030 | 12/2015 |
| WO | WO 2009/044065 | 4/2009 |

\* cited by examiner

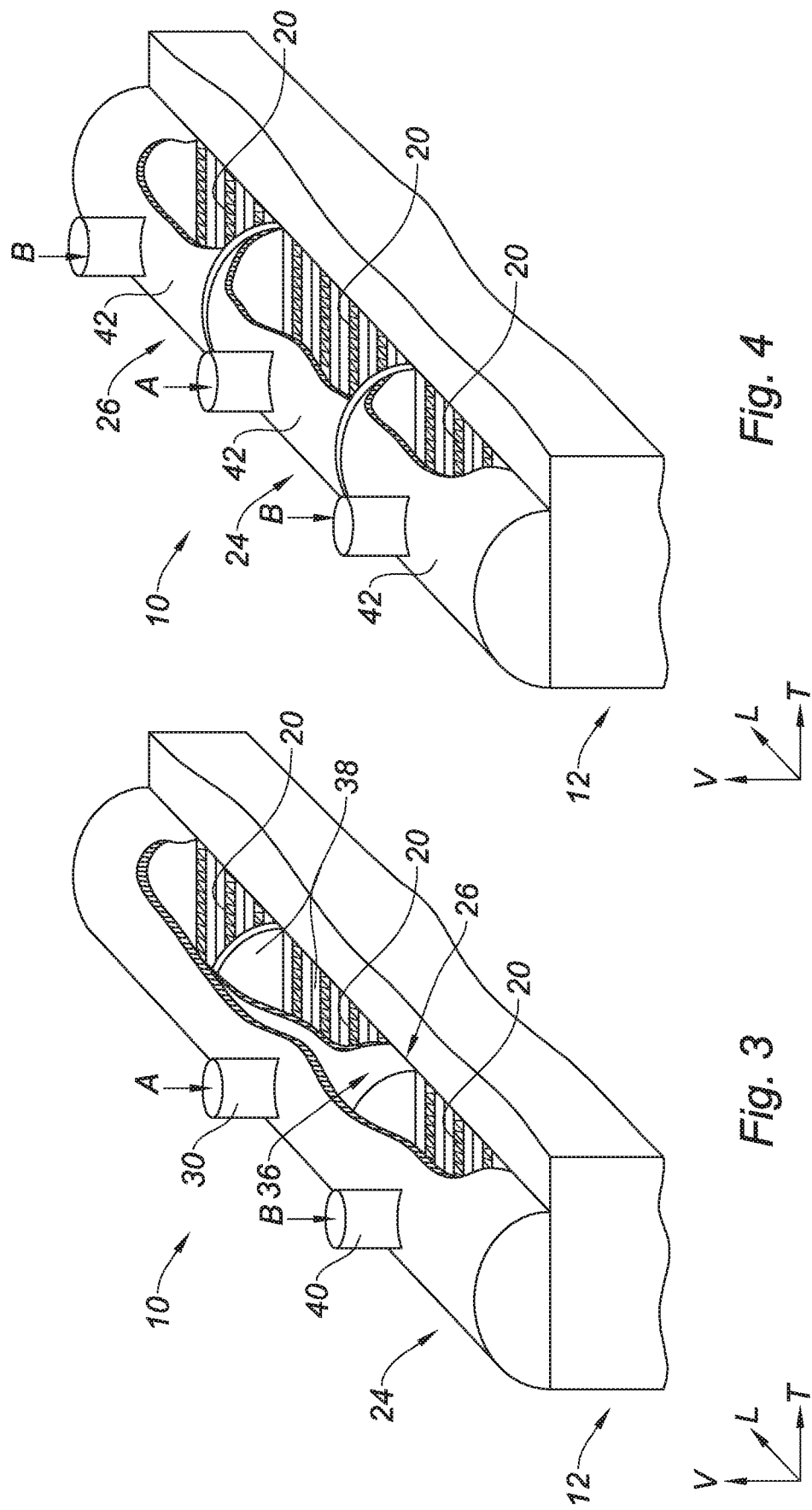

METHOD FOR PRODUCING A SERIES OF AT LEAST A FIRST AND A SECOND HEAT EXCHANGERS

CROSS REFERENCE TO RELATED APPLICATIONS

This application claims the benefit of priority under 35 U.S.C. § 119 (a) and b) to French patent application No. FR1859810, filed Oct. 24, 2018, the entire contents of which are incorporated herein by reference.

FIELD OF THE INVENTION

The invention relates to a method for producing a series of at least a first and a second heat exchanger. It also relates to a heat exchanger and to an air separation unit comprising a heat exchanger.

The heat exchanger is a configurable brazed-plate heat exchanger for cooling, for example, at least one fluid intended to be distilled in an air separation unit.

BACKGROUND OF THE INVENTION

It is known practice to use a brazed-plate heat exchanger, generally made of aluminium, in the design of, for example, a cryogenic exchanger.

Typically, the exchanger comprises one or more heat exchange matrix units interconnected by fluid distribution pipework (manifolds). Each heat exchange matrix unit is made up of at least a stack of brazed sheets, with the passages between them, and of tanks collecting the fluids from the various passages. The brazed matrix unit comprises a successive stack of sheets and of corrugated fins, and a plurality of passages which are delimited by the stacking of the sheets and of the corrugated fins so as to allow there to flow through the exchanger at least a first fluid and a second fluid which exchange their heat with at least one third fluid.

The passages open onto the faces of the body via openings which are capped by the said fluid distribution tanks.

Air separation units which comprise brazed-plate exchangers need to meet the variable demands of the requester.

Specifically, the pressures and flow rates of the air and of the various fluids that pass through the exchangers vary from one air separation unit project to another.

This same problem is obviously encountered in other fields in which multiple exchangers are used.

One common means for adapting to suit the demands of the client is to design and manufacture custom-built exchangers.

This custom-built production of exchangers represents a high cost and is subject to long manufacturing lead times which cannot be shortened because custom-built manufacture does not allow certain raw materials (sheets, corrugated fins, etc.) to be procured in advance.

It is also known practice to manufacture heat exchangers containing standardized matrix units, as proposed in document WO-A-2009/044065.

What is meant by a standardized matrix unit is a matrix unit that has a predefined length, width and height of stack of sheets, predefined types of corrugated fins in each passage and which has a predefined number of passages and of openings.

Thus, standardized matrix units of the same type are all identical and can be mass produced ahead of the design phase of an exchanger for an air separation unit or a distillation unit for example.

Document WO-A-2009/044065 describes and depicts an air separation unit comprising an exchange line which comprises a first assembly of exchangers which are mounted in series and a second assembly of exchangers which are mounted in series.

The exchangers comprise standardized matrix units of the same type. The air separation unit described in document WO-A-2009/044065 notably involves altering the number of bodies mounted in series in order to meet the specification.

This feature implies fitting more matrix units than are needed, thereby increasing the cost of the unit, or fitting fewer matrix units than are needed, implying a degradation of the amount of energy needed for the operation of the air separation unit.

SUMMARY OF THE INVENTION

The present invention notably seeks to address these disadvantages and in order to do so relates to a method for producing a series of at least a first and a second heat exchanger, each exchanger comprising:

at least one heat exchange matrix unit which comprises a successive stack of separator sheets and of corrugated fins delimiting a plurality of passages suited to allowing at least a first fluid, a second fluid and a third fluid to flow through the matrix unit, so that the third fluid can heat or be heated by the first and second fluids, each plate having a length and a width, the stack having a direction of stacking perpendicular to the length and to the width of the sheets, the matrix unit comprising a predetermined number of openings which are each formed in a peripheral face of the matrix unit and which each communicate with one of the said associated passages, at least one elongate fluid distribution tank which caps at least some of the openings and which is connected to a pipe, the axis of the tank being parallel to the direction of stacking and perpendicular to the width and to the length of the sheets, the matrix unit or units of the first exchanger being substantially identical to that/those of the second exchanger, The method being able to adapt the exchangers of the series by partitioning the tank into several compartments using a partitioning means provided for that purpose, so as to distribute the number of openings assigned to the first fluid and to the second fluid, the partitioning means being designed to divide the said tank into several compartments which are each connected to a pipe for the passage of the first fluid or to a pipe for the passage of the second fluid and which each communicate with a number of openings that varies according to the configuration adopted by the partitioning means, so as to distribute the number of openings assigned to the first fluid and to the second fluid.

According to other optional subjects:

the partitioning means comprises at least a first partition, in a main distribution tank, of which the position on the matrix unit is chosen between a plurality of positions that make it possible to choose the number of openings assigned to the first fluid and to the second fluid.

the openings are aligned and spaced uniformly on the said peripheral face of the exchanger.

a main distribution tank covers all of the openings.

one distribution tank, possibly a main distribution tank, covers just some, or even most, of the openings, and at least one other distribution tank covers another proportion, or even the rest, of the openings.

the pipes which are connected to the said compartments and/or at least one manifold connecting various pipes of the various heat exchange bodies of a separation unit to one another, have a position in space that is identical regardless of the configuration of the partitioning means.

the partitioning means is a semicircular plate arranged parallel to the sheets.

the shape of the partitioning means conforms to the contour of the tank.

the partition is parallel to the width of the sheets.

the partition is perpendicular to the axis of the main tank.

Another subject of the invention provides a series of heat exchangers produced as described above.

Another subject of the invention provides an air separation unit comprising at least one series of heat exchangers as described above.

The invention makes it possible to select the number of passages assigned to each fluid after the brazed matrix unit has been produced, by defining the distribution tank system on a case-by-case basis. This makes it possible to achieve economies of scale by mass-producing matrix units.

In addition, prefabricating the matrix units makes it possible to reduce the manufacturing lead time for the exchanger.

According to one preferred embodiment, the partitioning means comprises at least a first partition, in the main distribution tank, of which the position on the matrix unit can vary between a plurality of positions; this makes it possible to select the number of openings assigned to the first fluid and to the second fluid.

This feature means that a selected number of openings can easily be assigned to each fluid.

For preference, in order to allow the matrix unit of the exchanger to be prefabricated in advance and achieve economies of scale, the matrix unit is a standardized matrix unit.

According to an alternative form of embodiment of the invention, the partitioning means comprises at least one secondary distribution tank, which forms a compartment inside the main tank, which caps a number of openings that is delimited according to its size, and which is connected to a pipe for the passage of the associated fluid. This secondary tank can be only partially covered by the main tank.

Conventionally, the openings are aligned and distributed uniformly on the said peripheral face of the exchanger.

Also, the matrix unit of the exchanger may comprise a succession of identical sequences, each sequence being formed of a successive stack of separator sheets and of corrugated fins forming a series of passages.

In addition, the main distribution tank (or the combination of the main and of the secondary distribution tanks) covers all of the openings for the first and second fluid.

Advantageously, the pipes which are connected to the said compartments and/or the manifolds connecting the various pipes of the various heat exchange bodies of the separation unit to one another, have a position in space that is identical regardless of the configuration of the partitioning means.

This feature means that it is possible to retain the same interfaces between the exchanger and the rest of the installation, or of the plant, whatever the chosen configuration of the partitioning means.

BRIEF DESCRIPTION OF THE DRAWINGS

Further features and advantages of the invention will become apparent from reading the detailed description which follows, for an understanding of which reference will be made to the attached drawings in which:

FIG. 3 is a perspective view, with cutaway, illustrating an exchanger comprising a main distribution tank containing a secondary distribution tank.

FIG. 4 is a perspective view, with cutaway, illustrating an exchanger comprising a main distribution tank made up of three distribution tanks back to back.

The description and the claims will adopt, nonlimitingly, the terms longitudinal, vertical and transverse employed with reference to the trihedral frame of reference L, V, T indicated in the figures. The direction of the stacking of the sheets L is perpendicular to the length in the vertical direction V and the width in the transverse direction T of the separator sheets 15. The separator sheet is depicted in shortened form; in reality, its length in the vertical direction V is far greater than its width in the transverse direction T.

DETAILED DESCRIPTION OF THE INVENTION

For the various alternative forms of embodiment, the same references may be used for elements that are identical or that perform the same function, for the sake of simplifying the description.

Figure 1:
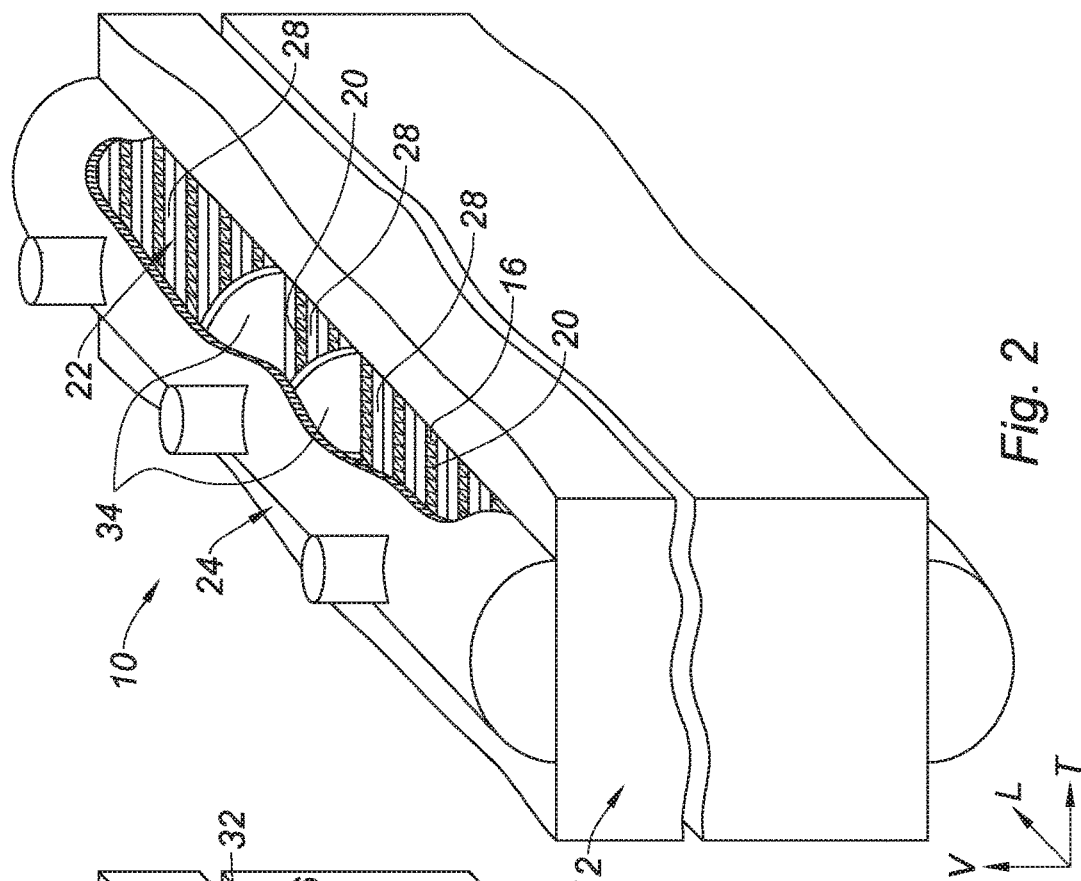
FIG. 1 is a perspective view, with cutaway, illustrating an exchanger comprising a main distribution tank equipped with partitions, the positions of which can vary according to the project, according to one preferred exemplary embodiment of the invention.

FIG. 1 depicts a heat exchanger 10 of the brazed-sheet type, which is notably intended to equip an air separation unit.

The exchanger 10 comprises a matrix unit 12 comprising a successive stack of separator sheets 15 and of corrugated fins 16 along a longitudinal axis, these being brazed together and delimiting a plurality of passages (not depicted). 14 corresponds to the passages for the third or for the other fluids that exchange with the first and second fluids and which therefore do not open onto an opening in the distribution tank or tanks for the first and second fluid. In instances in which the exchanger is associated with an air separation unit, the first fluid may be residual nitrogen from the low-pressure column of a double column, the second fluid may be pure nitrogen from the low-pressure column, and the third fluid may be air intended for the high-pressure column of the double column.

The passages extend vertically and are designed to allow the flow of fluids and the transfer of heat through the exchanger 10. In the figures, the tank is positioned above the stack of sheets, but as an alternative, the tank may be positioned on the lateral side of the stack of sheets in contact with openings that allow fluids to be transferred towards the passages. The matrix unit 12 here is a standard matrix unit.

What is meant by a standard matrix unit 12 is a matrix unit which has a vertical length, a transverse width, and a longitudinal height of stacking that is predefined and that comprises a predefined number of passages, of types of corrugated fin per passage and of openings.

Thus, standard matrix units of the same type are all identical and can be mass produced ahead of the design phase of an exchanger for an air separation unit for example.

According to the example described here, the matrix unit 12 performs an exchange of heat between the first fluid A, a second fluid B, and at least one third fluid.

In order to do this, the exchanger 10 comprises a predetermined number of openings 20 which are each formed in an inlet face 22 of the exchange body 12 and which each communicate with an associated passage.

In addition, the exchanger 10 comprises an elongate main fluid distribution tank 24 which caps the openings 20 formed on the inlet face 22 of the matrix unit 12. It is positioned with its axis in the direction of stacking L, perpendicular to the length and to the width of the sheets.

The main distribution tank 24 comprises a partitioning means 34 designed to divide the main tank 24 into several compartments 28. In this instance, the means 34 is a semicircular plate arranged parallel to the sheets. Its shape conforms to the contour of the tank 24. The partition is parallel to the width of the sheets and perpendicular to the axis of the main tank.

Each compartment 28 is connected to a pipe 30 for the passage of the first fluid A, or to a pipe 40 for the passage of the second fluid B.

The invention makes it possible to distribute the number of openings 20 assigned to the first fluid A and to the second fluid B variably, after the matrix unit 12 has been manufactured.

Advantageously, the pipes 30 and 40, and/or a manifold which connects several pipes coming from different exchange bodies 10 of the same separation unit, occupy a position in space that is identical regardless of the configuration of the partitioning means 32, 34.

This feature means that it is possible to retain the same interfaces between the exchanger 10 and the rest of the installation, or of the plant, whatever the chosen configuration of the partitioning means 32, 34.

Figure 2:
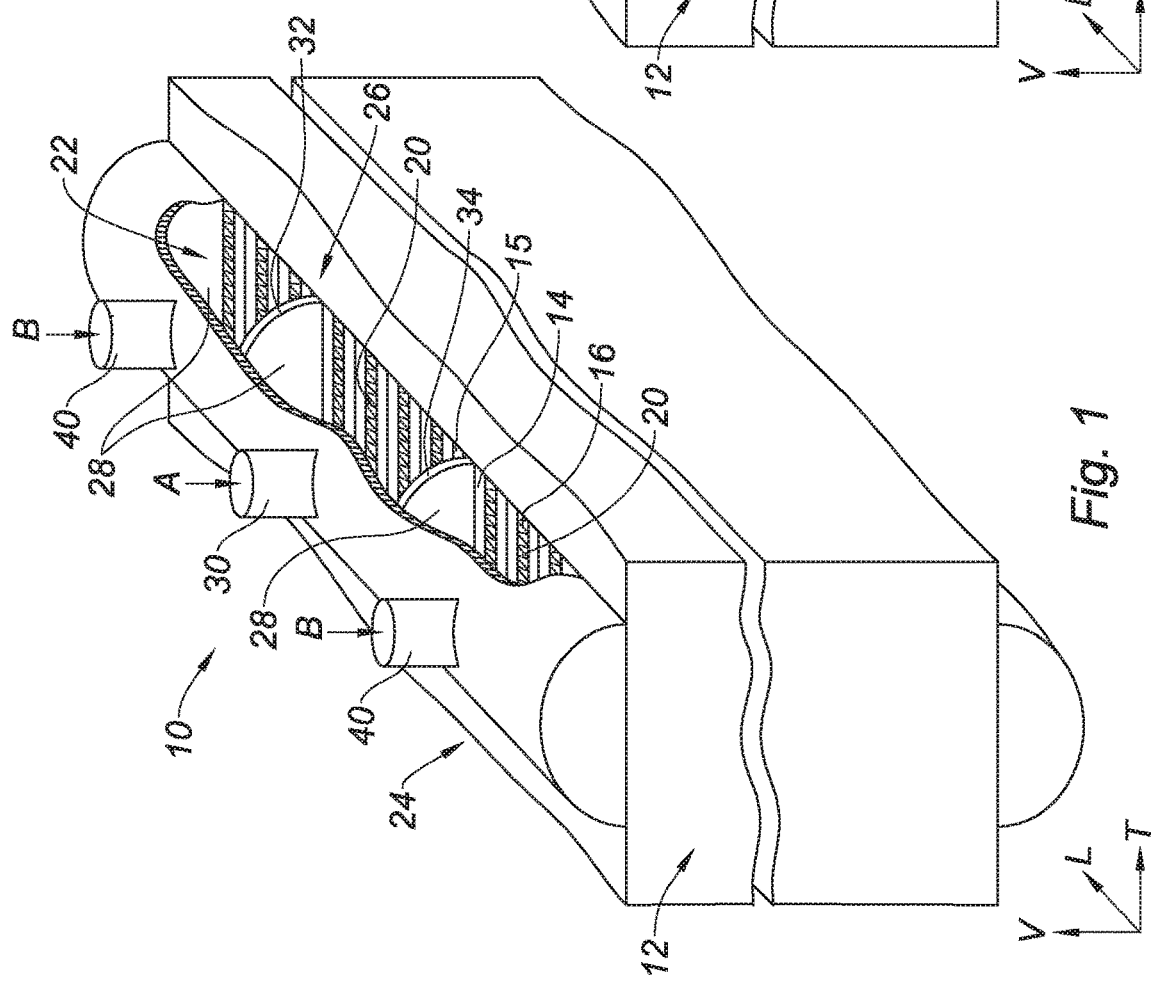
FIG. 2 is a perspective view, with cutaway, illustrating the exchanger of FIG. 1 with its partitions, the positions of which can vary according to the project, arranged in a different configuration.

According to one preferred exemplary embodiment of the invention, depicted in FIGS. 1 and 2, the partitioning means comprises a first partition 32 and a second partition 34 each of which is mounted, on a case-by-case basis, after the matrix unit has been brazed, at variable positions in the main distribution tank 24, in order to compartmentalize the volume of the main tank 24 into three compartments 28. The partitions 32, 34 are in the shape of a semicircle and conform to the shape of the wall of the tank 24 so as to render the compartments 28 sealed with respect to one another.

The two lateral compartments 28 group together the openings 20 which are assigned to the second fluid B, and the central compartment 28 groups together the openings 20 which are assigned to the first fluid A, for example.

FIG. 1 illustrates a first example of the positioning of the partitions 32, 34, in which example the three compartments 28 are of identical size, each compartment 28 grouping together the same number of openings 20.

As an alternative, FIG. 2 illustrates a second example of the positioning of the partitions 34, in which example the central compartment 28 groups together fewer openings 20 than the other two compartments 28.

Thus, by comparing FIGS. 1 and 2, it may be seen that the method according to the invention makes it possible to manufacture two different heat exchangers from two substantially identical matrix units by varying only the partitioning of the tank 24, so that the fluid A circulates in the first exchanger of the series illustrated in FIG. 1 through more passages than it does in the second exchanger of the series illustrated in FIG. 2. It may also be noted that the first exchanger dedicates fewer passages to fluid B than does the second.

The allocation of the passages may also be done in other ways.

According to a first alternative form of embodiment of the invention, depicted in FIG. 3, the partitioning means 26 comprises a secondary distribution tank 36 which forms a compartment 38 inside the main tank 24. This compartment 38 may be completely or partially covered by the main tank 24.

The secondary tank 36 is equipped with a pipe 30 for the passage of the first fluid A, the pipe 30 passing through the main tank 24.

Likewise, the main tank 24 is equipped with a single pipe 40 for the passage of the second fluid B.

The secondary tank 36 caps a number of openings 20 that is delimited according to its size along the longitudinal axis, which is parallel to the direction of stacking of the sheets.

According to a second alternative form of embodiment of the invention, depicted in FIG. 4, the main distribution tank 24 is made up of three tanks 42 which may or may not be back to back, so as to cap the openings 20 of the matrix unit 12.

According to this alternative form of embodiment, the partitioning means 26 is made up of the combination of tanks 42.

The longitudinal dimension of the tanks 42 is adapted to suit the number of openings 20 and of passages that are to be associated with the first fluid A and with the second fluid B.

According to one preferred exemplary embodiment of the invention, the matrix unit 12 of the exchanger 10 is formed of a succession of identical sequences, each sequence being formed of a successive stack of separator sheets 15 and of corrugated fins 14 and 16 forming a series of passages.

Advantageously, the sequences may be prefabricated and placed/brazed back to back one after the other to form the matrix unit 12.

In addition, according to one exemplary embodiment of the invention, the openings 20 are aligned and distributed on the inlet face 22 of the matrix unit 12.

The invention also relates to a method for producing a heat exchanger 10 of the type described above.

The method notably consists in mounting the main tank 24 on the standard matrix unit 12 and in partitioning the main tank 24 into several compartments 28 using the partitioning means 26 provided for that purpose, according to the specific parameters desired for the exchanger 10, in order to distribute the number of openings 20 assigned to the first fluid A and to the second fluid B.

The present description of the invention is given by way of nonlimiting example.

In order to make the description clearer, only the main fluid distribution tank 24 which caps the openings 20 formed on the inlet face 22 of the matrix unit 12 has been described.

It will be appreciated that the exchanger 10 according to the invention may comprise several other tanks for collecting and/or distributing the other fluid(s);

In the examples, the tank 24 is placed on the upper surface of the heat exchanger. It may equally be placed on the lower surface or on a lateral wall of the exchanger.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A method for producing a series of at least a first and a second heat exchanger, each exchanger comprising:
   at least one heat exchange matrix unit which comprises a successive stack of separator sheets and corrugated fins delimiting a plurality of passages suited to allowing at least a first fluid, a second fluid and a third fluid to flow through the matrix unit, so that the third fluid can heat or be heated by the first and second fluids, each sheet having a length and a width, the stack having a direction of stacking perpendicular to the length and to the width of the sheets;
   each matrix unit comprising a predetermined number of openings, which are each formed in a peripheral face of the matrix unit, and wherein each opening communicates with one of the passages;
   at least one elongated fluid distribution tank which caps at least some of the openings and which is connected to a pipe, an axis of the tank being parallel to the direction of stacking and perpendicular to the width and to the length of the sheets;
   the matrix unit or units of the first exchanger being substantially identical to that/those of the second exchanger;
   wherein the method comprises the steps of adapting the exchangers of the series by partitioning each tank into several compartments using a partitioning means so as to assign a number of the openings to each of the first fluid and the second fluid, the partitioning means being configured to divide each tank into several compartments which are each connected to a pipe for the passage of the first fluid or to a pipe for the passage of the second fluid and which each communicate with a number of the openings that varies according to a configuration adopted by the partitioning means, so as to distribute the number of openings assigned to the first fluid and to the second fluid.

2. The method according to claim 1, wherein for each exchanger the partitioning means comprises at least a first partition, in a main distribution tank, wherein a position of the at least first partition on the matrix unit is chosen between a plurality of positions that makes it possible to choose the number of openings assigned to the first fluid and to the second fluid.

3. The method according to claim 1, wherein for each exchanger the openings are aligned and spaced uniformly on the peripheral face of the matrix unit.

4. The method according to claim 1, wherein for each exchanger a main distribution tank covers all of the openings.

5. The method according to claim 1, wherein for each exchanger one main distribution tank covers just some of the openings, and at least one other distribution tank covers another proportion, or even the rest, of the openings.

6. The method according to claim 1, wherein the pipes which are connected to the compartments each have a position in space that remains constant regardless of the configuration of the partitioning means.

7. The method according to claim 1, wherein the partitioning means is a semicircular plate arranged parallel to the sheets.

8. The method according to claim 1, wherein the shape of each partitioning means conforms to a contour of each respective tank.

9. The method according to claim 1, wherein the partitioning means is parallel to the width of the sheets.

10. A series of heat exchangers produced according to the method according to claim 1.

11. An air separation unit comprising at least one series of heat exchangers according to claim 10.

* * * * *